United States Patent

[11] 3,572,478

| [72] | Inventors | William S. Nagel<br>Franklin;<br>Mack H. Lawrence, Farmington, Mich. |
|---|---|---|
| [21] | Appl. No. | 871,789 |
| [22] | Filed | Oct. 31, 1969 |
| [45] | Patented | Mar. 30, 1971 |
| [73] | Assignee | Eaton Yale & Towne, Inc.<br>Cleveland, Ohio<br>Continuation of application Ser. No.<br>679,468, Oct. 31, 1967, now abandoned. |

[54] BRAKE MECHANISM
37 Claims, 13 Drawing Figs.

[52] U.S. Cl. ............................................. 188/330,
188/79.5, 188/196
[51] Int. Cl. ..................................................... F16d 51/52
[50] Field of Search........................................... 94/110;
188/18, 78, 79.5, 196, 206

[56] References Cited
UNITED STATES PATENTS
2,132,576  10/1938  Nachtwey..................... 188/79.5(GC)
2,804,177  8/1957  Helvern......................... 188/79.5(GC)

*Primary Examiner*—Duane A. Reger
*Attorney*—Yount, Flynn & Taralli

ABSTRACT: A brake mechanism comprises a pair of brakeshoes which are displaceable to contact a brakedrum to effect braking thereof. Each of the brakeshoes has first and second ends. Abutment means contacts the respective first ends of the brakeshoes, and actuator means in the form of a wedge actuator effects outward displacement of the second ends of the brakeshoes an equal amount during braking. The brakeshoes are mounted on a sheet metal spider member which is located generally centrally with respect to the brakeshoes. The abutment means which contacts the first ends of the brakeshoes consists of a pair of cam members which are rotated to effect adjustment of the brakeshoes in response to brake lining wear.

Patented March 30, 1971

INVENTORS
WILLIAM S. NAGEL
MACK H. LAWRENCE

BY
Yount, Flynn and Tarolli
ATTORNEYS

Patented March 30, 1971

INVENTORS
WILLIAM S. NAGEL
MACK H. LAWRENCE

BY Yount, Flynn and Tarolli

ATTORNEYS

Patented March 30, 1971  3,572,478

INVENTORS
WILLIAM S. NAGEL
MACK H. LAWRENCE
BY Yount, Flynn and Tarolli
ATTORNEYS

Patented March 30, 1971

INVENTORS
WILLIAM S. NAGEL
MACK H. LAWRENCE
BY
Yount, Flynn and Tarolli
ATTORNEYS Patented March 30, 1971

INVENTORS
WILLIAM S. NAGEL
MACK H. LAWRENCE
BY
Yount, Flynn and Tarolli
ATTORNEYS Patented March 30, 1971

INVENTORS
WILLIAM S. NAGEL
MACK H. LAWRENCE
BY
*Yount, Flynn and Jarolli*
ATTORNEYS

BRAKE MECHANISM

This application is a continuation of application Ser. No. 679,468, filed Oct. 31, 1967, now abandoned.

This invention relates to a brake mechanism for association with a brakedrum to effect braking of the brakedrum, and particularly relates to a brake mechanism which includes brakeshoes which are displaceable to frictionally contact the brakedrum to effect braking thereof.

The principal object of the present invention is the provision of a new and improved vehicle brake mechanism which is constructed so as to provide for substantially equal wear of the brakeshoes thereof and a minimum of brakeshoe and brakedrum distortion.

A further object of the present invention is the provision of a new and improved brake mechanism in which adjacent ends of the brakeshoes are displaced equal distances during braking by a wedge-type actuator means so that, as a result, the brakeshoes do the same amount of work during braking and, therefore, the brakeshoes wear substantially equally.

A still further object of the present invention is the provision of a new and improved brake mechanism, as noted in the next preceding paragraph, wherein the wedge actuator comprises a pair of spaced wedge-shaped projections, each of which moves between an anchor and a respective end of a brakeshoe to effect displacement of the brakeshoe.

Another object of the present invention is the provision of a new and improved brake mechanism in which brake lining wear is compensated for by a "wear-equalizing" type of automatic brakeshoe adjuster which includes a pair of cam members against which the ends of the brakeshoes abut and which are rotatable simultaneously to effect simultaneous and equal adjustment of the brakeshoes.

Still another object of the present invention is the provision of a new and improved brake mechanism in which the brakeshoes are mounted on a platelike support member which is constructed of sheet metal providing a lightweight brake structure and which is located generally centrally of the brakeshoes and includes portions for mounting the brake actuator mechanism thereon, as well as a brake adjuster mechanism.

Yet another object of the present invention is the provision of a new and improved brake mechanism which is readily adaptable to fit different axles by the use of a spacer member which may be interposed between the axle housing and the support for the brake mechanism to properly locate the brake mechanism relative to the axle housing.

A further object of the present invention is the provision of a new and improved brake mechanism in which brake lining wear is compensated for by an adjuster mechanism which effects adjustment of the position of the brakeshoes upon the actuating stroke of the plungers which effect movement of the brakeshoes to effect application of the brakes.

A still further object of the present invention is the provision of a new and improved brake mechanism which includes a mechanical means interposed between the brakeshoes to effect movement of the brakeshoes and wherein brake lining wear is compensated for by a brakeshoe adjuster which operates to effect brakeshoe adjustment as a function of the clearance between the brakeshoe and the brakedrum.

Further objects and advantages of the present invention will be apparent from the following description of a preferred embodiment thereof made with reference to the accompanying drawing forming a part of this specification and in which:

The present invention provides an improved vehicle brake mechanism which is constructed so as to provide for substantially equal wear of the brakeshoes thereof. The brake mechanism of the present invention, moreover, effects a minimum of brakeshoe and brakedrum distortion. The brake mechanism of the present invention may be applied to numerous different vehicles, but is primarily constructed for truck use.

Figures 1, 9:
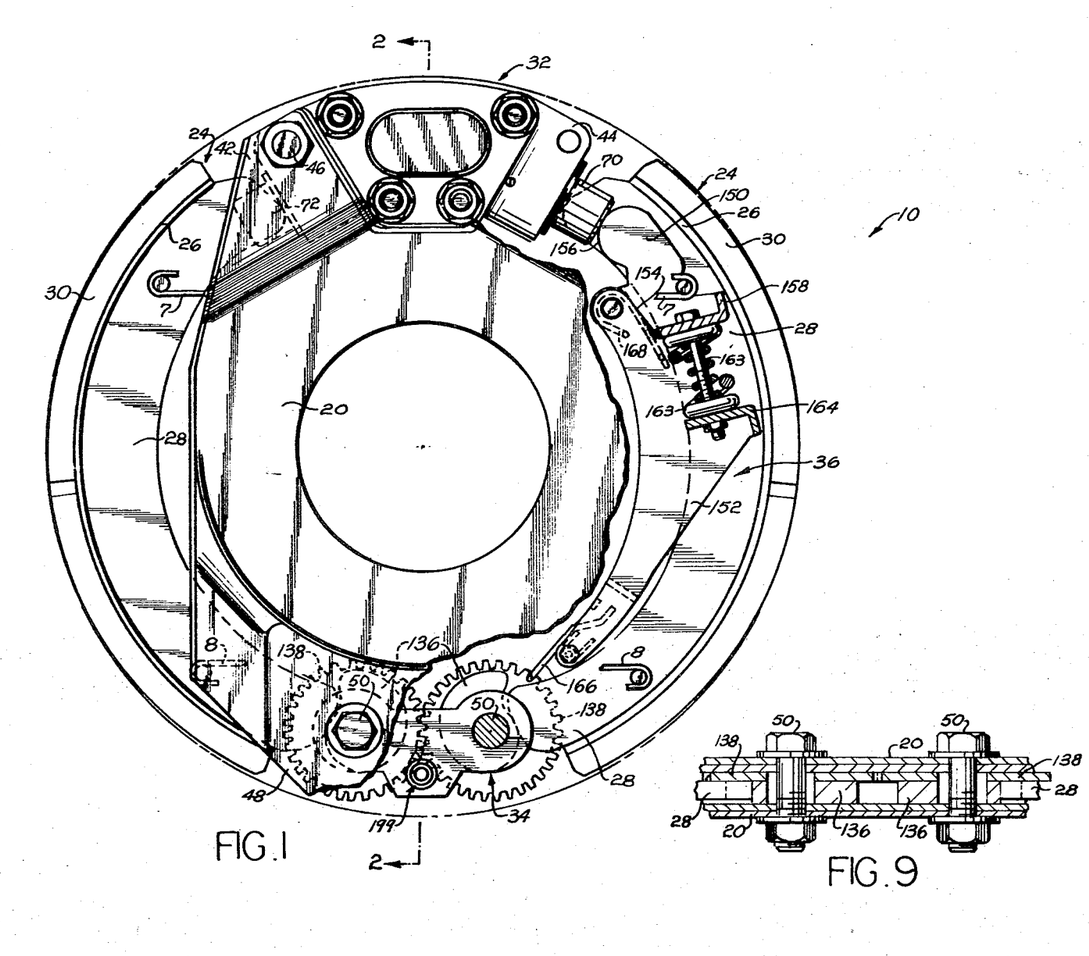
FIG. 1 is a side elevational view with parts broken away and parts in section of a brake mechanism embodying the present invention.
FIG. 9 is a sectional view taken approximately along the line 9—9 of FIG. 8.

As representing the preferred embodiment of the present invention, FIG. 1 illustrates a brake mechanism 10. The brake mechanism 10 is associated with a brakedrum 9, see FIG. 2, carried by a vehicle wheel. The vehicle wheel, in turn, is carried by an axle housing 12. The specific details of the wheel mounting, axle, and axle housing will not be described in view of the fact that these are conventional and merely illustrative of an environment in which the brake mechanism of the present invention may be utilized.

The brake mechanism 10 which is associated with the brakedrum 9 includes a pair of brakeshoes 24. Each of the brakeshoes 24 has a table 26 and a web 28. Friction linings 30 are mounted, as by riveting or bonding, on the table 26 of the brakeshoes 24. The linings 30 are fabricated of a suitable compound for frictional and wear properties and appropriate resistance to heat that is generated during brake application by the linings being pressed against the drum to effect stopping of the vehicle.

The brakeshoes 24 are biased toward a deactuated position by springs 7, 8 and are displaced outwardly to engage the brakedrum to effect braking thereof. The brakeshoes 24 are mounted in a manner to permit free floating movement thereof. An actuator mechanism 32 is mounted between adjacent ends of the brakeshoes 24 to effect the outward movement of the brakeshoes, as will be described in detail hereinbelow. The other ends of the brakeshoes 24 abut an abutment means 34. As the actuator mechanism 32 spreads the adjacent ends of the brakeshoes 24 apart, the opposite ends of the brakeshoes are free to rotate and slide on the abutment means 34. The brakeshoes 24 are thus brought into contact with the rotating annular drum to effect stopping of the vehicle. An automatic wear-adjuster mechanism 36 is cooperatively associated with the actuator mechanism 32 and the abutment means 34. The adjuster mechanism 36 effects automatic adjustment of the position of the brakeshoes in response to brake lining wear.

The brake mechanism 10 is mounted in association with the axle housing 12 and, particularly, is fastened to an axle housing flange 54. The brake mechanism specifically includes a support means for mounting the brakeshoes 24 on the axle housing 12. The means for supporting the brakeshoes includes a spider support member 20. The spider member 20 supports the brakeshoes 24, actuator 32, and adjustment mechanism 36 and is adapted to be directly secured to the axle housing flange 54.

Figure 10:
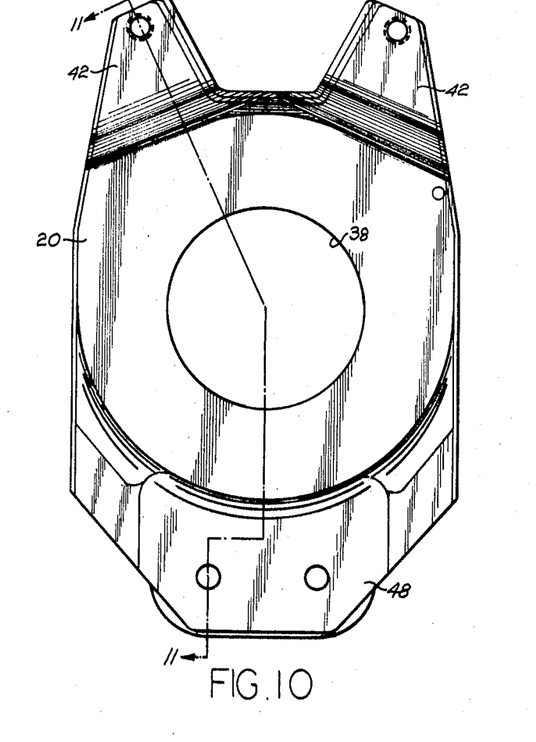
FIG. 10 is an elevational view of a support member which is utilized in the brake mechanism of FIG. 1.
Figure 11:
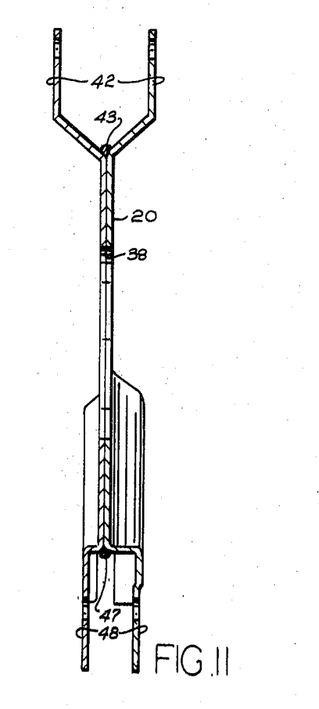
FIG. 11 is a sectional view, taken approximately along the section line 11—11 of FIG. 10.

The spider 20 is a lightweight element manufactured from sheet steel or other suitable material. As is shown in FIGS. 10 and 11, the spider member 20 is comprised of a double thickness of sheet steel. Defined in the center of the spider member 20 is a circular aperture 38 for the purpose of providing clearance for the axle housing 12. Defined in the spider 20 adjacent circular aperture 38 are a plurality of bolt holes 40 for a purpose to be described hereafter. The spider 20 is generally rectangular in shape and includes at each end thereof means to secure the actuator 32 and the abutment means 34 thereto. Adjacent the actuator 32, the spider 20 is provided with tab portions 42. The tab portions 42 are provided by the dual plates comprising the spider 20, which plates diverge to provide the tab portions 42 extending on either side of a housing 44 for the actuator 32. A weld 43 is provided in the spider for stability. The housing 44 is secured between the tab portions 42 by means of fasteners 46, see FIG. 1. Fasteners 46 may include a nut, bolt, and washer combination or any other suitable fastening means within the art.

At the opposite end of the spider 20, the plates comprising the spider member diverge to define offset portions 48. A weld 47 is provided at the point of divergency for stability. The offset portions 48 define a chamber in which is received the abutment means 34. The abutment means 34, which will be described in greater detail hereinafter, may be secured to the spider 20 by means of fasteners 50 comprising a bolt, nut and washer combination, or any other fastening means within the skill of the art.

From the above, it should be apparent that the spider member 20 comprises two stamped sheet elements secured together by welds 43, 47. The center of the spider is defined by a single plane comprised of two sheets of metal held in abutting relationship by the welds and in which there is provided a circular aperture 38 to receive the vehicle axle. At either end of the spider member 20, the plate elements diverge to form offset portions 42, 48 in order to support the actuator 32 and the abutment means 34.

It is to be noted that because the spider member 20 of this invention is manufactured entirely from stamped metal, a significant weight reduction may be achieved over the traditional cast spider.

As noted hereinabove, the spider 20 is secured to the axle flange 54 which projects from the axle housing 12. The axle flange 54 has a plurality of bolt receiving holes therein. A spacer element 58 is interposed between the axle flange 54 and the spider 20. The spacer element 58, shown in FIG. 12, comprises a ringlike member having a plurality of bolt receiving holes complementary to the bolt receiving holes of the axle flange 54. The bolt receiving holes are provided by projecting portions 58a of the spacer member 58. A dust shield 64 is located between the axle flange 54 and the spacer 58. The dust shield 64 may take the form of a thin metal stamping and is provided for the purpose of minimizing the entry of dust, dirt, water, and other foreign matter into the brake from the under portion of the vehicle. The bolts which secure the spider 20 to the flange 54 extend through openings in the spider 20, spacer 58, dust shield 64, and into the axle flange 54.

The purpose of the spacer element 58 is threefold. First, it serves to position the spider 20 concentrically relative to the axle flange, and at the midpoint of the brake drum. Secondly, the spacer element provides for adaptability of the spider to different axles by merely selecting the appropriate-sized spacer. In prior art devices wherein the spider is defined by a single cast metal element, it is customary to provide fixed projections on the spider itself such that the spider may be bolted directly to the flange of the vehicle axle. Thus, a serious shortcoming in prior art devices exists, namely in that interchangeability of a prior art spider with various vehicle axles is not possible. Within the industry there is no standard for positioning the flange on the vehicle axle. Thus, depending upon the manufacturer of the vehicle axle, it will be necessary to position the spider a given distance from the axle flange in order to properly position the brakeshoes within the drum. Heretofore, in brakes of the prior art wherein the brake spider directly contacts the axle flange, it has been necessary to design a particular spider for a particular axle. By this invention, a separate element or spacer 58 is introduced between the axle flange 54 and the spider 20 such that the spider may be universally adapted to any vehicle axle regardless of manufacture. Thus, should the offset or distance at which the spider is to be located from the axle flange vary, as it does from axle to axle, it is not necessary by this invention to completely replace the spider 20. A suitable spacer element 58 need only be changed in order to adapt the spider to any vehicle axle.

Figure 12:
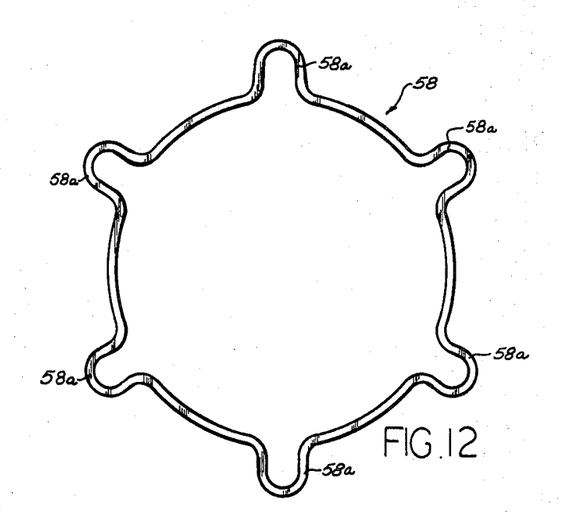
FIG. 12 is an elevational view of a spacer member which is incorporated in the brake mechanism of FIG. 1.

The spacer element 58 of this invention should not be considered as limited to the particular design shown in FIG. 12. It is contemplated that a spacer element may take many different forms.

The actuator 32 which is secured to the spider 20 effects outward displacement of the adjacent ends of the brakeshoes 24 upon actuation thereof. The actuator 32 operates to displace the ends of the brakeshoes 24 equal distances. This, of course, due to the known self-energizing of the brakeshoes requires a greater force to be applied to one brakeshoe, namely, the trailing brakeshoe, than to the other. The actuator mechanism 32 is constructed to do so.

Broadly speaking, the actuator 32 is of the wedge type and may be described as a single wedge brake actuator comprising a bifurcated wedge element 69. The single wedge brake actuator includes the operator housing 44 in which there are disposed a pair of brakeshoe engaging pistons 70, 72. Movement of the wedge element 69 effects movement of the pistons 70, 72, as will be described hereinbelow. The pistons 70, 72 have slotted outer faces, extending outwardly from the extremities of the housing 44 and which slots receive the webs 28 of the brakeshoes 24. Each piston 70, 72 has a longitudinal slot 70a therein which receives a pin 70b to prevent rotation of the piston in the bore in which it is located. The longitudinal axes of the cylindrical pistons 70, 72 converge toward each other and form with the horizontal an angle of 30°. The included angle between the longitudinal axes of the pistons 70, 72 is, therefore, 120°. The reason for this particular angular relationship of the pistons will be more fully described hereinafter.

Figure 2:
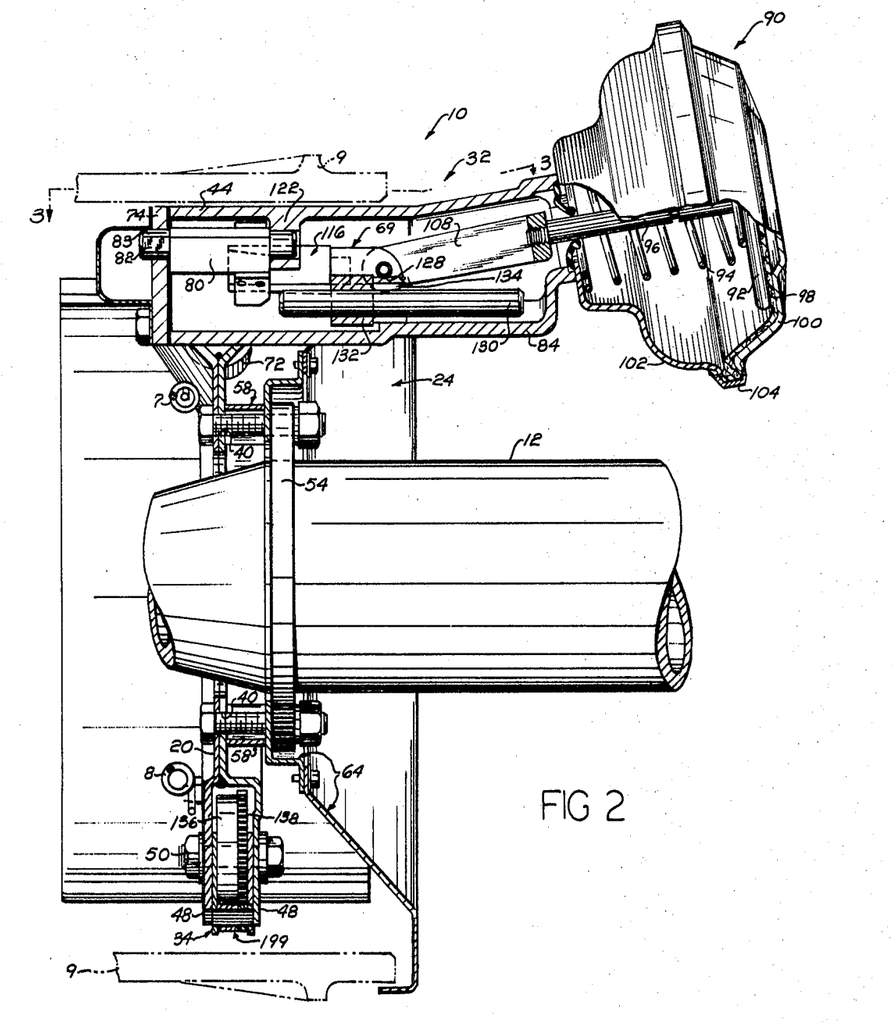
FIG. 2 is a sectional view, taken approximately along the section line 2—2 of FIG. 1.
Figure 3:
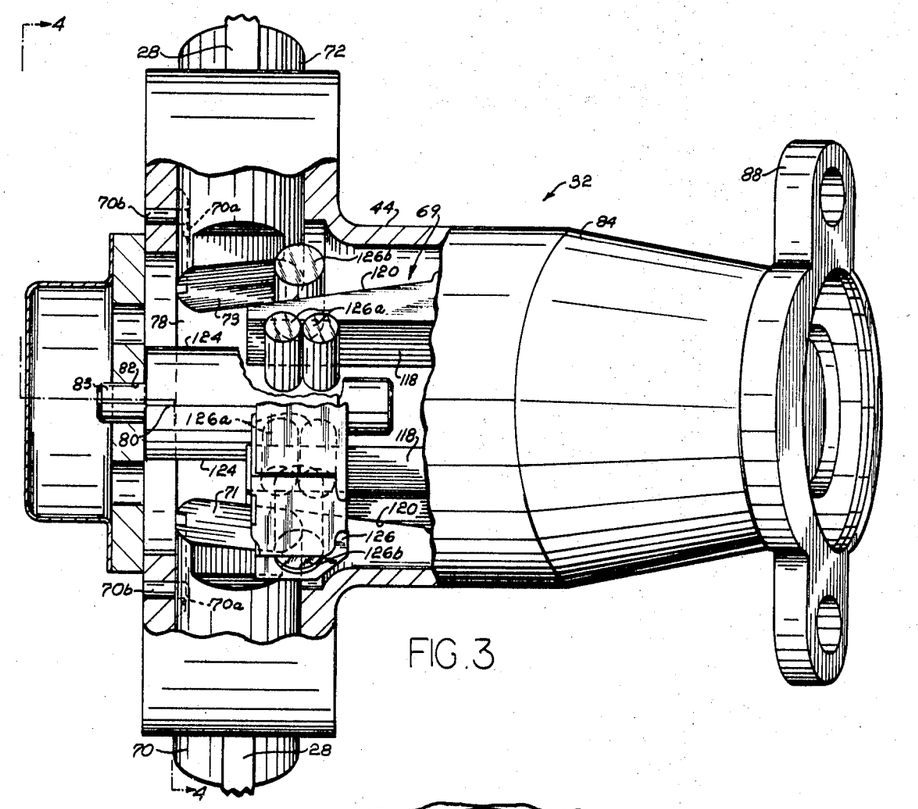
FIG. 3 is a sectional view with parts broken away, taken approximately along the line 3—3 of FIG. 2.
Figure 4:
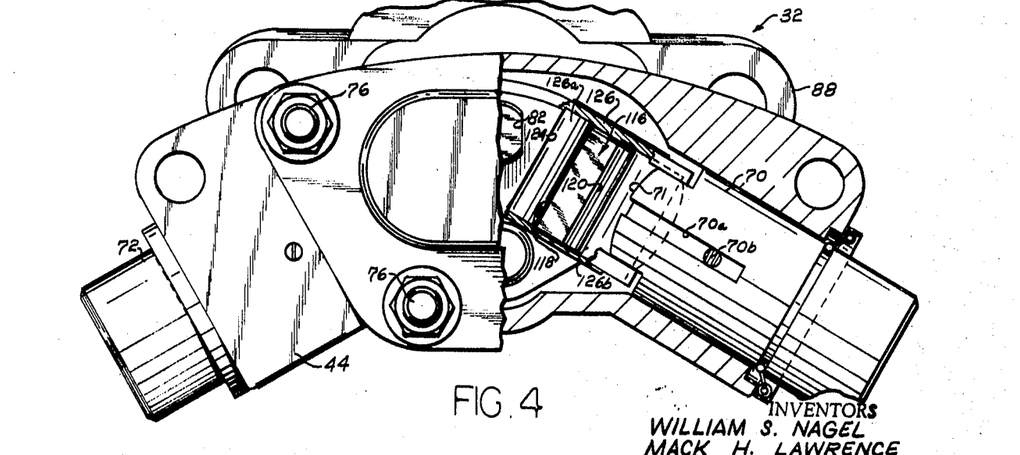
FIG. 4 is a view of the mechanism shown in FIG. 3 looking approximately along the line 4—4 thereof.
Figure 5:
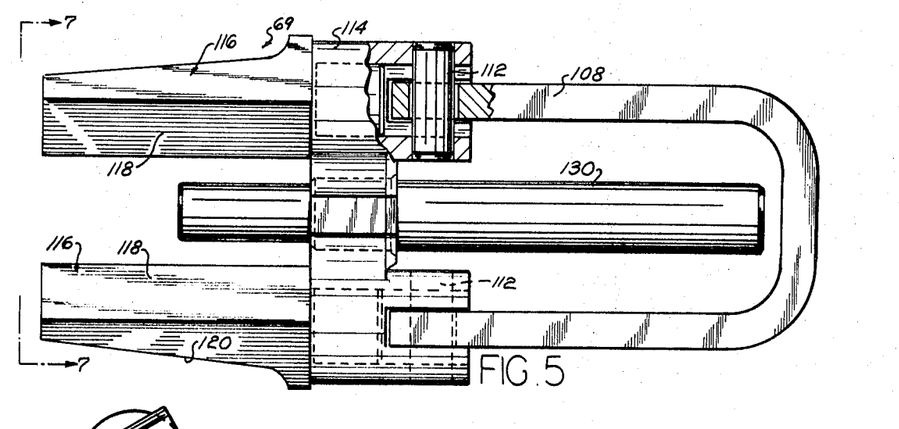
FIGS. 5 and 6 are views of portions of the brake mechanism shown in FIG. 3.
Figure 6:
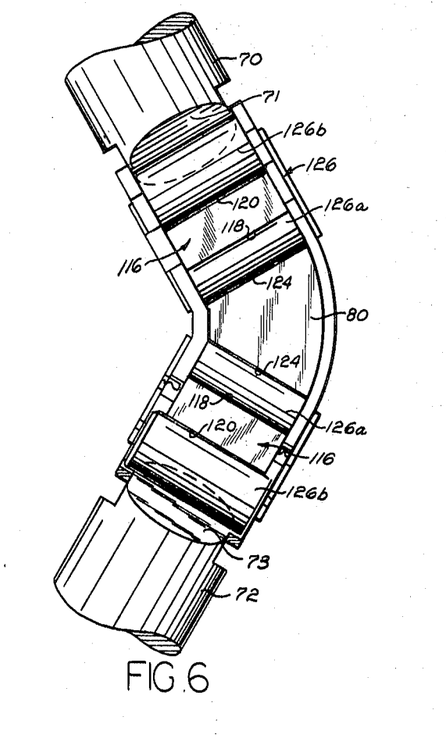
Figure 7:
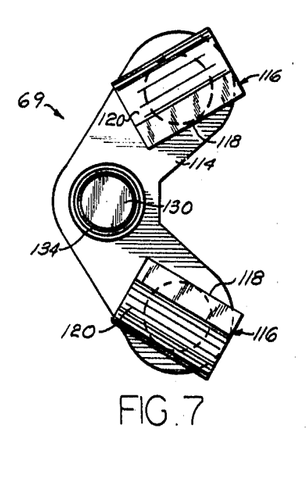
FIG. 7 is an end view of the mechanism shown in FIG. 5, looking along the line 7—7 thereof.

The pistons 70, 72 are slidable in bores defined in respective legs of the housing 44. A cover plate 74 is secured to the outer face of housing 44 by means of fasteners 76. The purpose of the cover plate 74 is to generally close the cavity 78 in the housing 44, as well as provide a locking support for an actuator anchor 80 for a purpose to be more fully described hereinafter. The locking support is provided by means of a double "D" recess 82 in the cover plate, which recess 82 receives a complementary or mating extension 83 of the actuator anchor 80. The function of extension 83 and mating recess 82 is to prevent rotation of the actuator anchor 80 and to provide translational support for the anchor. Reference may be made to FIGS. 3 and 4 where the cover plate 74, fastener 76, actuator anchor 80 and recess 82 are more clearly shown. As may also be seen in FIG. 2, housing 44 includes a projection 122 depending into the cavity or central portion of the housing. Defined in the projection 122 is a cylindrical bore for receiving a portion of the anchor 80, and the projection 122 blocks translational movement of the actuator anchor 80.

Integral with the housing 44 is a generally hollow cylindrical housing portion 84 including an attaching flange 88 at one end thereof. The purpose of the attaching flange 88 is to provide a receiving surface for an air motor 90. The design of the air motor 90 forms no part of this invention. A conventional motor available to the industry is shown in FIG. 2. The air motor 90 includes a piston element 92, spring 94, pushrod 96, and a flexible diaphragm 98. The motor housing is defined by elements 100, 102 secured together by means of a clamp band 104. The outer periphery of diaphragm 98 is secured to the motor casing between the elements 100 and 102. A lip seal is provided at the interface of the air motor 90 and housing 44 to keep foreign matter from entering from the air motor into the housing 44.

In the operation of the air motor 90, compressed air from a central vehicle source is introduced between the element 100 and the flexible diaphragm 98. The piston 92 is thus forced to the left in FIG. 2 moving the pushrod 96 to the left in FIG. 2. The pushrod 96 is, in turn, secured to the bifurcated single wedge element 69 of this invention to effect movement of the brakeshoes 24 and thus actuate the brake. Depending on the size of the air motor 90, it may be necessary to mount the air motor in an axis that is not parallel to the vehicle axle axis. As shown in FIG. 2, therefore, the housing 44 is configured such that the air motor 90 is mounted on an axis that converges toward the vehicle axle axis. Such a mounting configuration permits larger air motors to be secured to the housing 44.

Secured to the air motor pushrod 96 is a yoke 108. As shown in FIG. 2, the pushrod 96 is suitably connected to the yoke 108. The legs of yoke 108 are pivotally secured to the body 114 of the wedge 69 by means of pivot pins 112. The wedge body 114 has a pair of projecting wedge tines 116. Each tine includes a face 118 which lies in a plane parallel to the plane of faces 124 on the actuator anchor 80. Each tine 116 also includes a wedge face 120 which converges toward face 118.

Tines 116 of wedge body 114 straddle the actuator anchor 80. As may be seen from FIG. 3, the faces 124 of the actuator anchor 80 extend perpendicular to the longitudinal axes of both the pistons 70, 72 and their piston bores. Surrounding both tines 116 is a roller cage 126 including a pair of roller elements 126a located between the actuator anchor 80 and the tine and a single roller element 126b larger in diameter than each of the rollers 126a. The purpose of the roller elements is to minimize friction between the wedge tines 116, the actuator anchor 80 and the piston 70, 72.

The rollers 126b contact the wedge surface 120 and the surfaces 71, 73 of the piston members. The surfaces 71, 73 of the piston members 70, 72, respectively, extend parallel to the surface 120 on the respective tine members 116. The rollers 126a roll on the surface 124 of the anchor member 80 and the surface 118 of the wedge projections 116. Each of the wedge projections 116 move toward the left, as viewed in the drawing, and particularly in FIG. 3. The roller members 126b will be forced outwardly away from the rollers 126a by the movement of the wedge projections 116. The roller cage 126 and the rollers 126b are associated in a manner which permits movement of the rollers 126b outwardly relative to the cage 126. This outward movement of the rollers 126b will cause a force to be applied to the surface 71, 73 of the plunger members and effect an outward movement of the plunger members, which, in turn, effects an outward displacement of the ends of the brake members 24.

The rollers 126a, 126b roll along the respective surfaces of the anchor 80, wedge tines 116, and surfaces of the plungers 70, 72 upon movement of the wedge 69. The rollers 126a, 126b and cage 126 move one-half of the distance of movement of the tines 116 of wedge 69 due to the inherent nature of their association. The rollers 126a, 126b roll along the surfaces which they engage and do not slide thereon. In the illustrated embodiment, due to the fact that the projections 116 are identical in construction and that the rollers 126a, 126b which are associated with the projections are likewise identical in construction and positioned in a predetermined relationship with the anchor 80 by roller cage assembly, the plunger members 70, 72 will be moved outwardly an equal distance, thereby effecting equal displacement of the ends of the brakeshoes 24.

When the brakeshoes engage the rotating brakedrum to effect braking thereof, there is a self-energizing effect on the brakeshoes which is well known. This self-energizing effect tends to resist the outward displacement of the trailing end of the trailing brakeshoe and, thus, the force which is applied to the trailing end of the trailing brakeshoe by the actuator mechanism must be greater than that which is applied to the leading brakeshoe. The construction is such, of course, that the force which is applied is sufficient to overcome the self-energization tendency to maintain the displacement of the brakeshoes equal at all times and to ensure equal displacement of the brakeshoes, even though the self-energizing force is tending to resist displacement of at least one of the brakeshoes.

From the above, it can be seen that certain geometrical relationships must exist between the piston faces 71, 73 and the wedge faces 120. The piston faces 71, 73 are angled at about 5½° from the normal, as are the wedge faces 120, this angle being critical as it determines the mechanical advantage to be had as the wedge acts upon the piston in actuating the brakes. This angle may vary somewhat dependent upon the size brake and anticipated vehicle loads the brake must handle. However, the parallel relationship between the piston faces 71, 73 and wedge faces 120 must be maintained. Also, as can be best seen in FIG. 1, the piston bore axes intersect the anchor faces 124 at an angle of 90°.

Defined within the housing 44 is a projection 128 including a passageway therein for the purpose of receiving a guide rod 130. Interposed between the guide rod 130 and the projection 128 is a bushing 134. Thus, the guide rod 130 is free to reciprocate in bushing 134. A portion of the guide rod near one end thereof is secured to a projection 132 and functions to limit the return stroke of the wedge assembly. Thus, as force is exerted by the pushrod 96 of the air motor 90 tending to displace the wedge body 114 to the left of FIG. 3, the guide rod 130 supports one end of the the wedge body against the vertical force component developed as the result of the nonparallel relationship of the axes of the air motor and the wedge body and against unequal force components of the wedge actuator to be described more fully hereinbelow, with the inner pair of rollers supporting the opposite end of the wedge body. Thus, as the wedge body 114 moves to the left of FIG. 3, guide rod 130 is carried to the left while being supported for horizontal movement by the projection 128 of the housing 44 and the inner pair of rollers.

The abutment means 34 which cooperates with the ends of the brakeshoes opposite the ends with which the actuator 32 is associated comprises a plurality of elements sandwiched between the offset portions 48 of spider 20. The elements which comprise the abutment means include a pair of cams 136 and a pair of gears 138. Each gear 138 is secured to one of the cams 136 to provide for rotation thereof as a unit.

The cams 136 are shown in outline in FIG. 1. Engaging these cams 136 are the webs 28 of the brakeshoes 24 such that as the cams 136 are rotated inwardly, as shown in FIG. 1, the brakeshoes 24 will be forced outwardly so as to decrease the clearance between the lining 30 and the annular brakedrum.

The gears 138 which are secured to the respective cams 136 are in meshing engagement and provide an interconnection between the cams 136 such that as one cam is rotated in a clockwise direction, the opposite cam is rotated an equal amount in a counterclockwise direction so as to provide equal and simultaneous movement of the brakeshoes 24 with respect to the annular brakedrum.

Figure 8:
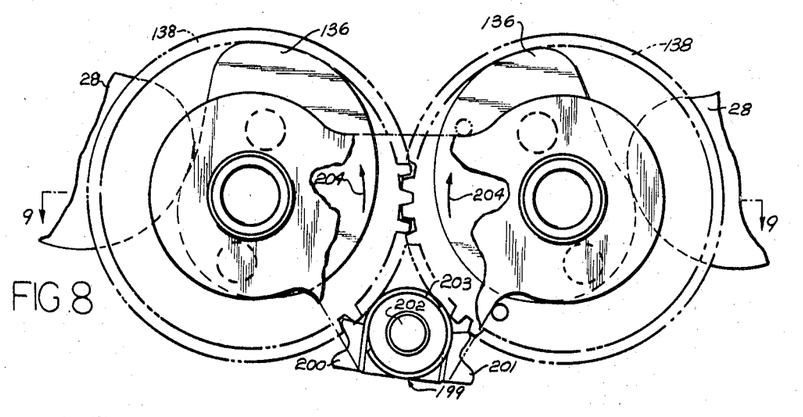
FIG. 8 is a view of a portion of a brakeshoe adjuster mechanism embodied in the brake of FIG. 1.

The gears 138 have a one-way drive mechanism 199 associated therewith. In the embodiment of FIG. 8, this one-way drive mechanism 199 comprises a pair of relatively pivotal pawls 200, 201 supported for pivotal movement about a pin 202. The pawls 200, 201 are biased into engagement with the respective gears 138 by a torsion spring 203. The pawls 200, 201 are associated with the gears so that movement of the gears 138 in the direction of arrows 204 is prevented. The pawls 200, 201 permit indexing rotation of the gears 138 to effect rotation of the cams 136. The pawls 200, 201 alternatively engage the teeth of the respective gears 138 and limit rotation of the gears 138 in the direction of the arrows 204. When the pawl 200 is in engagement with its associated gear 138, the pawl 201 rests on the crest of a gear tooth of the gear 138 with which it is associated. Likewise, when the pawl 201 is in engagement with its associated gear 138, the pawl 200 rests on the crest of a gear tooth of the gear 138 with which it is associated.

The brake adjuster mechanism includes an adjuster linkage 36 disposed between the piston 70 and the abutment means 34. The purpose of the linkage is to impart rotary motion to the gears 138 as a function of brake lining wear. The linkage includes a link 150 pivotally secured to a link 152 by means of a fastener 154. The link 150 has a face 156 for abutting the end of piston 70. On the opposite end of link 150 there is defined a flange 158 and a similar flange 164 is provided on link 152. A bolt 160 extends between the flanges. A spring means 162 is in compression and acts between the flanges 164, 158. At the end of link 152 adjacent the abutment means 34 there is provided a spring-loaded pawl 166 for the purpose of suitably engaging a tooth of gear 138. A torsion spring 168 engages the link 152 and biases the links 152, 150 in a counterclockwise direction as illustrated in FIG. 1 to maintain link 150 in contact with the plunger 70.

During operation of the brake mechanism, the plunger 70 moves outwardly and effects movement of the brakeshoe into engagement with the brakedrum. Moreover, the plunger effects movement of the link 150. Both the link 150 and link 152 pivot as a unit about the pivot provided by fastener 154 until the brakeshoe 24 engages the drum. When the link 152 pivots the gears 138 are rotated and the cams 136 are rotated therewith until the brakeshoes engage the brakedrum. Further rotation of cams 136 and gears 138 is thus prevented due to the frictional torque developed between the brakeshoe 24 and the cam 136. The force transmitting capacity of the linkage 36 is insufficient to overcome the frictional torque necessary to advance the cams 136 after the shoes 24 contact the drum. Further movement of the brake plunger 70 results in compression of the spring means 162 and movement of link 150 relative to link 152.

The normal clearance between the brakeshoes 24 and the brakedrum is less than the amount of movement imparted to the brakeshoes 24 by rotation of the gears 138 through an angular distance corresponding to the width of one gear tooth. Thus, the movement of the link 152 prior to engagement of the brakeshoes 24 with the drum is normally limited to an angular displacement at the pawl 166 of less than one gear tooth when the brakeshoes are in proper adjustment.

In the event, however, that the distance between the brakeshoes 24 and the brakedrum is greater than the amount of movement imparted to the brakeshoes 24 by rotation of the gears 138 through an angular distance corresponding to the width of one gear tooth, as by wear of the brake lining, when the link 150 is moved by the plunger 70, the link 152 will be pivoted a greater distance. As a result, this pivoting movement of the link 152 and the pawl 166 on the outer end thereof will effect a sufficient rotation of the gears 138 so that the pawl 166 engages a new tooth on the gear 138 upon removal of the brake application force. Therefore, the brakeshoe position is adjusted due to the rotation of the cams 136. When the cams rotate, they move the ends of the brakeshoes with which they engage outwardly to thereby effect adjustment of the clearance between the brake lining and the brakedrum.

From the above, it should be apparent that the adjustment of the brakeshoes 24 is effected on the actuating stroke of the wedge 69, as opposed to on the return stroke. Moreover, the adjustment is effected only when there is abnormal clearance between the brakeshoes 24 and the brakedrum. The present brake mechanism is thus not subject to making a premature adjustment of the brakeshoes due to drum expansion and shoe distortion under high plunger forces.

The operation of the brake 10 will now be described in detail. Energization of the air motor 90 as by depression of the brake foot pedal in the cab of the vehicle imparts a leftward movement to the wedge 69. The wedge tines 116 are thus moved between the actuator anchor 80 and the opposed faces of pistons 70 and 72. Roller cage 126 is moved by the rollers which function to reduce friction between the engaging surfaces during the wedging movement. The function of the roller cage is first to initially position each set of three rollers per wedge tine in register and to maintain the rollers aligned so that full load during actuation passes through the heavier roller 126b while each of the pair of small rollers shares the reaction load equally, that is, each of the small roller carries one-half of the reaction load. Secondly, the roller cage functions to initially position each of the roller sets in alignment relative to each other so that the plungers move simultaneously and equal distances; and as a final function, the roller cage serves to align the rollers acting upon the faces of wedge, the pistons 70 and 72, and the faces of the actuator anchor 80 without binding. Due to the wedge faces 120 on tines 116, motion to the left of FIG. 2 will cause the pistons 70 and 72 to be translated out of the housing 44 thus causing the ends of the brakeshoes to be spread apart.

An important feature of the operation of this brake as described thus far is that the pistons 70 and 72 are translated an equal distance by the wedge tines 116, regardless of the fact that one of the brakeshoes is a leading shoe and the other a trailing shoe. The actuator anchor 80 serves to isolate the plunger forces from each other by absorbing the excess forces due to torque. Thus, regardless of the forces acting on the respective brakeshoes due to drum rotation, the wedge operator of this invention translates each shoe through an equal distance. The importance of the shoes moving equal distances lies in that such equal movements of the two shoes assures that each shoe does equal work, and the two attached brake linings wear equally. The brake actuator of this invention is thus to be distinguished from wedge brake actuators of the prior art wherein the actuator imparts an equal force to each brakeshoe. An equal force is not being imparted to the brakeshoes of this invention due to the fact that each shoe is treated equally with respect to shoe movement. Therefore, as may be seen in FIG. 13, a single unit of force, $F_1$, is needed to move the upper end of the leading shoe a given distance. To move the upper end of the trailing shoe a similar distance requires a larger force, $F_2$, in the magnitude of two to four times larger than $F_1$, the exact magnitude being dependent upon the coefficient of friction of the brake linings utilized. To briefly summarize this important feature of this invention, the opposed ends of the brakeshoe of the present invention are acted upon by the wedge actuator in a manner such that the brakeshoe ends are displaced equal distances by unequal forces, and such that each shoe thus performs an equal amount of work.

A further advantage of the actuator anchor 80 in isolating the forces of each shoe is that the brake is capable of providing equal braking torque in either direction of drum rotation. Thus a single brake design can be used on either the left or right side of a vehicle.

The opposite ends of the brakeshoes 24 abut a respective cam 136. As the bifurcated wedge element 69 tends to spread apart the brakeshoes at one end thereof, the one end of the brakeshoes 24 tend to slide on the plungers 70, 72 and the opposite ends of the brakeshoes 24 rotate and slide on the abutment means 34. The brakeshoes 24 are thus brought into contact with the rotating annular drum to stop the vehicle.

Figure 13:
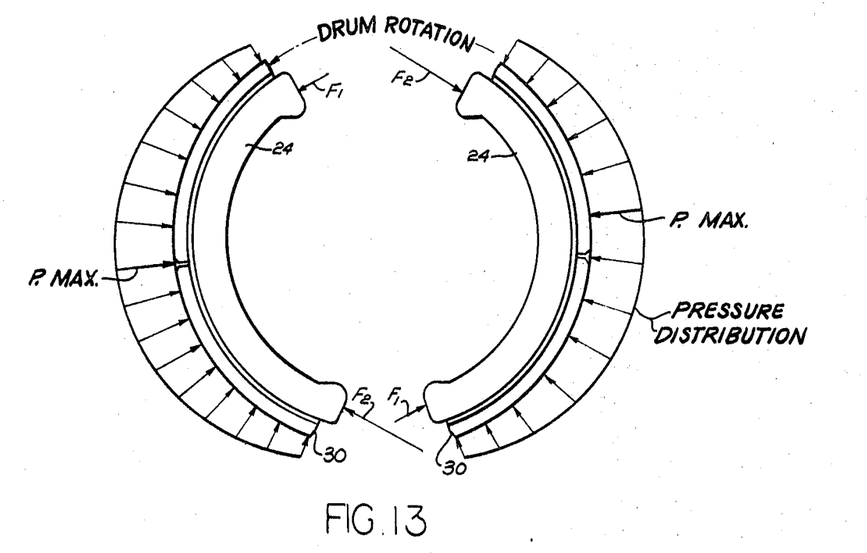
FIG. 13 is a diagrammatic view illustrating the resultant forces acting on the brakeshoes embodied in the brake of FIG. 1.

A force diagram of the respective shoes of the brake assembly of the present invention is shown in FIG. 13. As was previously described, the piston 70 and 72 are disposed at an angle with respect to each other such that the included angle between the pistons is 120°. Thus, the forces $F_1$ and $F_2$ acting upon the upper ends of the two shoes 24 of FIG. 13 are disposed downwardly at an angle of 30° from the horizontal. Similarly, the point of contact of the end of the brakeshoe and the respective cams (not shown) is disposed upwardly at an angle of 30° from the horizontal. This angular relationship is maintained during rotation of the cams 136 due to the shape of the cam surface. The respective reaction forces are shown as acting on the bottom ends of the opposed brakeshoes 24 to FIG. 13.

With reference to FIG. 13, it will be noted that the forces $F_1$ and $F_2$, with $F_2$ approximately two to four times larger than $F_1$, act on the ends of each brakeshoe 24 at an angle of 30° from the horizontal. This results in the creation of a center of wear near the center of the shoe.

Since the shoes 24 are mounted with the brake assembly such that they are free to float at either of their ends the resultant force diagram and pressure distribution as depicted in FIG. 13 is produced as a result of the above-described geometry. The maximum pressure occurs near the center of the shoe, and minimum pressure at some value greater than zero p.s.i. occurs at the ends of the shoe with pressure varying between these limits. The wear pattern of the linings follows the pressure distribution.

An advantage of this type of force geometry is that it provides for a reduction of shoe distortion. Since forces $F_1$ and $F_2$ do not act horizontally, but rather at an optimum angle, the tendency of the shoes to open at their ends is minimized. This results in less shoe distortion and less drum distortion.

From the above, it should be apparent that a new and improved brake mechanism has been provided, and that certain modifications, changes, and adaptations may be made.

We claim:

1. A brake mechanism for association with a brakedrum to effect braking of the brakedrum, said brake mechanism comprising a pair of brakeshoes for mounting in said drum and displaceable from an initial position to contact said drum, each of said brakeshoes having first and second ends, the first ends of said brakeshoes being adjacent each other and the second ends of said brakeshoes being adjacent each other, abutment means abuttingly engaging the respective first ends of said brakeshoes, and actuator means for effecting outward displacement of said second ends of said brakeshoes an equal amount into engagement with the brakedrum and for maintaining said second ends of said brakeshoes displaced equal distance from the initial position during braking, said actuator means including wedge means movable to effect said displacement, said wedge means effecting and maintaining equal displacement of said second ends of said brakeshoes by the application of unequal forces to said brakeshoes to overcome the self-energizing effect of the brakeshoes.

2. A brake mechanism as defined in claim 1 wherein said actuator means includes a pair of wedge projections which cooperate with the respective second ends of said brakeshoes to effect equal movement thereof during braking, and further including fluid operated power means for effecting simultaneous movement of said wedge projections.

3. A brake mechanism as defined in claim 2 further including a support plate means for said brake mechanism and an anchor secured to said support plate means and located between said wedge projections in bearing relationship therewith.

4. A brake mechanism as defined in claim 3 further including a roller cage carrying a plurality of rollers interposed between surfaces on said wedge projections and surfaces on said anchor means.

5. A brake mechanism as defined in claim 4 further including separate plunger members associated with said second ends of said brakeshoes to effect movement of said second ends of said brakeshoes upon movement thereof and wherein said roller cage further carries rollers interposed between said wedge members and said plunger members.

6. A brake mechanism as defined in claim 3 wherein said support plate means comprises a pair of generally rectangular sheet metal elements joined together to form a double-thickness member defining a first plane, an axle receiving aperture in said double-thickness member and offset portions at one end of said double-thickness member providing a support for supporting said actuator means.

7. A brake mechanism as defined in claim 1 further including means responsive to brake lining wear for effecting equal and simultaneous adjustment of said brakeshoes.

8. A brake mechanism as defined in claim 7 wherein said abutment means comprises a pair of cam members engageable with the ends of said brakeshoes and said adjustment means comprises means for effecting rotation of said cam members simultaneously and equally to effect said brakeshoe adjustment.

9. A brake mechanism as defined in claim 3 wherein said support plate means is adapted to be secured to a vehicle axle housing and further including spacer means separate from said support plate means and the axle housing and interposed between said support plate means and the axle housing to locate said support plate means with respect to said axle housing, and fastener means for securing said support plate means, spacer means and axle housing together.

10. A brake mechanism for association with a vehicle having a brakedrum carried by a vehicle axle and an axle housing, said brake mechanism comprising a pair of brakeshoes, support means supporting said brakeshoes for displacement to contact said drum, actuator means for effecting displacement of said brakeshoes, said support means comprising support plate means encircling said axle, and spacer means separate from said support plate means and the axle housing for location between said support plate means and the axle housing for location between said support plate means and the axle housing to locate said support plate means with respect to said axle, and fastener means for securing said support plate means, spacer means and axle housing together, with spacer means being in the form of a ring which encircles said axle and having openings provided therethrough for receipt of said fastener means.

11. A brake mechanism for association with a vehicle having a brakedrum carried by a vehicle axle and an axle housing, said brake mechanism comprising a pair of brakeshoes, support means supporting said brakeshoes for displacement to contact said drum, actuator means for effecting displacement of said brakeshoes, said support means comprising support plate means encircling said axle, and spacer means separate from said support plate means and the axle housing for location between said support plate means and the axle housing to locate said support plate means with respect to said axle, and fastener means for securing said support plate means, spacer means and axle housing together.

12. A brake mechanism as defined in claim 11 wherein said actuator means comprises a wedge actuator means movable to effect equal displacement of adjacent ends of said brakeshoes.

13. A brake mechanism as defined in claim 11 wherein said support plate means comprises a sheet metal plate having a portion for supporting said actuator means and said support plate being located generally centrally of said brakeshoes.

14. A brake mechanism for association with a brakedrum carried by a vehicle axle having an axle flange, said brake mechanism comprising a backing plate adapted to be secured to said axle flange, a pair of opposed expanding brakeshoes for mounting within said drum, and means for spreading said opposed expanding brakeshoes to contact with said brakedrum, said backing plate comprising a pair of generally rectangular thin sheet metal elements joined together to form a double-thickness member defining a first plane, an axle receiving aperture in said double-thickness member surrounded by a plurality of bolt receiving holes, offset portions at one end of said double-thickness member defining at least one plane parallel to said first plane and offset therefrom, and means on said offset portions for receiving said means for spreading said opposed expanding brakeshoes.

15. A brake mechanism as defined in claim 14 wherein said means for spreading said brakeshoes comprises a pair of wedge projections which cooperate with adjacent ends of said brakeshoes to effect equal movement thereof during braking and further including fluid operated power means for effecting simultaneous movement of said wedge projections.

16. A brake mechanism for association with a brakedrum to effect braking of the brakedrum, said brake mechanism comprising a pair of brakeshoes for mounting in said drum and displaceable to contact said drum, each of said brakeshoes having first and second ends, the first ends of said brakeshoes being adjacent each other and the second ends of said brakeshoes being adjacent each other, abutment means contacting the respective first ends of said brakeshoes, and actuator means for effecting equal outward displacement of said second ends of said brakeshoes during braking, said abutment means and said actuator means having cooperating floating engagements with said respective ends of said brakeshoes and applying forces to said brakeshoes to provide maximum brakeshoe wear near the center thereof and to produce a minimization of brakeshoe and brakedrum distortion, said actuator means comprising wedge means for effecting said equal displacement and maintaining said equal displacements during braking.

17. A brake mechanism for association with a brakedrum to effect braking of the brakedrum, said brake mechanism comprising a pair of brakeshoes, support means supporting said brakeshoes for displacement to contact said drum, each of said brakeshoes having first and second ends, actuator means interposed between opposed second ends of the brakeshoes to effect displacement of the brakeshoes upon actuation thereof, first and second rotatable cam members engaging said respective first ends of said brakeshoes and which upon rotation position the brakeshoes closer to the brakedrum, and drive means for simultaneously rotating said cam members to position said brakeshoes closer to the brakedrum in response to a predetermined amount of movement of said brakeshoes toward the brakedrum.

18. A brake mechanism as defined in claim 17 wherein said means for effecting rotation of said cam members comprises a pair of relatively pivotal links, one of said links being movable upon actuation of said actuator means and the other of said links cooperating with said cam members to effect rotation thereof, spring means biasing said links apart and providing for pivotal movement of said links as a unit until said brakeshoes engage said brakedrum and enabling movement of said one link relative to the other thereafter.

19. A brake mechanism as defined in claim 18 wherein said drive means includes gears associated with said other link for rotation upon movement thereof, said gears being positioned to effect rotation of said cams upon rotation thereof.

20. A brake mechanism as defined in claim 17 wherein said drive means comprises meshing gears connected with said respective cam members and means for rotating said gears in response to a predetermined amount of movement of the brakeshoes toward the brakedrum.

21. A brake mechanism for association with a vehicle having a brakedrum carried by a vehicle axle, said brake mechanism comprising a pair of brakeshoes, actuator means interposed between adjacent ends of said brakeshoes for effecting displacement thereof for braking, said actuator means including at least one wedge member movable generally parallel to the axle of the vehicle and fluid-operated power means for moving said wedge member, said fluid-operated power means being divergently mounted with respect to said vehicle axle and being operable to impart motion to move said wedge axially of the vehicle axle to effect displacement of said brakeshoes.

22. A brake mechanism as defined in claim 21 wherein said fluid-operated power means includes a reciprocating output member which is movable in an angular direction relative to the vehicle axle, means pivotally connecting said output member and said wedge member, and means for guiding movement of said wedge member axially of the vehicle axle upon movement of said output member.

23. A brake mechanism as defined in claim 22 wherein said actuator means effects outward displacement of the brakeshoes an equal amount and maintains said brakeshoes displaced equal distances from their initial positions during braking.

24. A brake mechanism for association with a brakedrum to effect braking of the drum, said braking mechanism comprising a pair of brakeshoes for mounting in the drum and displaceable from an initial position to contact the drum, one of the shoes being a leading and one a trailing shoe, each of the brakeshoes having first and second ends, the first ends of the shoes being positioned adjacent to each other and the second ends of the shoes being positioned adjacent to each other, abutment means abuttingly engaging the first ends of the shoes for adjusting the running clearances of the shoes relative to the drum, brake application actuator means interposed between the opposed second ends of the brakeshoes for effecting displacement of the second ends an equal amount to displace the shoes into engagement with the drum and for maintaining said second ends displaced equal distances from the initial position during braking, said brake application actuator means comprising wedge means interposed between the second ends of said shoes and movable between said second ends to displace the shoes into drum engaging, brake applying relation, and fixed anchor means cooperating with said wedge means, preventing lateral movement of the wedge means as the result of unequal brake reaction forces of the leading and trailing shoes, and said anchor means in combination with said wedge means effecting and maintaining equal displacement of the second ends of the shoes by the application of unequal forces to the shoes to overcome the self-energizing effects of the respective shoes.

25. The invention of claim 24 wherein said wedge means comprises a bifurcated wedge and said anchor means is embraced by said wedge, and including antifriction means between the wedge and anchor and antifriction means between the wedge and said second ends of the shoes.

26. A brake mechanism for association with a brake drum to effect braking of the drum, said brake mechanism comprising a pair of brakeshoes one of which is a leading and one a trailing shoe, support means supporting said brakeshoes for displacement to contact the drum, each of said shoes having first and second ends, respectively opposed to one another, brake application actuator means interposed between opposed second ends of the brakeshoes, the brake application actuator means including wedge means interposed between the second ends to effect displacement of the shoes an equal amount upon actuation of the actuator means, fixed anchor means between opposed first ends of the brakeshoes and means mounting first and second movable adjuster members to said anchor means and engaging said first ends of the shoes, said adjuster members being effective on movement to adjust the brakeshoes closer to the brakedrum and thereby maintain accurate running clearance, and drive means for simultaneously moving said adjuster members to adjust both brakeshoes closer to the drum in response to a predetermined amount of brake application movement of the brakeshoes toward the brakedrum, and said drive means being responsive to brake lining wear.

27. The invention of claim 26 wherein said brake application actuator means further comprises fixed anchor means cooperating with said wedge means preventing lateral movement of the wedge means as the result of unequal brake reaction forces of the leading and trailing shoes.

28. The invention of claim 26 wherein said adjuster members comprise a pair of rotatable cams associated with the fixed anchor means, each cam abutting a respective first end of a brakeshoe and said drive means being adapted to simultaneously rotate said cams an equal amount to equally decrease the clearance between the brakedrum and the lining of each of the brakeshoes.

29. The invention according to claims 24 wherein the braking mechanism is carried by a vehicle axle having an axle flange, and the braking mechanism includes a backing plate adapted to be secured to said axle flange, said backing plate having a body lying in a first plane, an axle receiving aperture in the body and means for securing said body to the axle flange, a pair of spaced suspension points spaced radially outwardly from said axle receiving aperture and displaced axially to each side of the plane of said body, the brake application actuator means including means for engaging and spreading the brakeshoes into contact with the drum, and means mounting said brakeshoe spreading means by and between said suspension points so that thrust forces from said brakeshoe spreading means are absorbed between the suspension points and thus into said backing plate thereby substantially eliminating bending stresses in the baking plate body.

30. The invention of claim 29 wherein said backing plate comprises a pair of sheet metal elements joined together to form said body having the axle receiving aperture, each element having an offset portion thereby providing said pair of axially spaced suspension points spaced to each side of the plane of the body, said braking mechanism including adjuster means for adjusting the running clearance between the shoes and the drum, the backing plate having additional radially spaced suspension points, displaced axially to each side of the plane of said body, said additional suspension points being oriented generally diametrically opposite to the means for mounting the brakeshoe spreading means, and means mounting said adjuster means by and between said additional suspension points so that thrust forces from said adjuster means are absorbed between the suspension points and into the body of the backing plate without lateral bending stresses in the backing plate, and said additional suspension points being oriented generally opposite to the brakeshoe spreading means to provide a balance of forces across the body of the brake backing plate thereby avoiding bending stresses in the backing plate.

31. A brake mechanism for association with a brakedrum to effect braking of the brakedrum, said brake mechanism comprising a pair of brakeshoes, support means supporting said brakeshoes for displacement to contact said drum, each of said shoes having first and second ends respectively positioned in opposed relation to one another, brake application actuator means including wedge means interposed between opposed second ends of the shoes to effect displacement of the shoes an equal amount during brake application engagement with the drum; and movable abutment means abuttingly engaging the first ends of the shoes for adjusting the running clearance of the shoes relative to the drum to compensate for brake lining wear, and means for moving said abutment means, operable on the brake application stroke of said brake application means.

32. The invention of claim 31 including anchor means preventing rotary movement of said abutment means and the shoes as the result of unequal brake reaction forces of the leading and trailing shoes, said anchor means in combination with said abutment means, effecting and maintaining equal displacement of said first ends of the shoes by application of unequal forces to the first ends to overcome the self-energizing effects of the respective shoes.

33. The invention of claim 31 wherein said means for moving said abutment means for adjusting the running clearance comprises one-way force limiting means between the brake application actuator means and said abutment means, said one-way force limiting means being operable in response to a predetermined amount of movement of said brakeshoes toward contact with the brake drum.

34. The invention of claim 31 wherein said means for moving said abutment means comprises a pair of relatively pivotal links, one of said links movable upon actuation of said actuator means and the other of said links cooperating with said abutment means to effect movement thereof, biasing means between said links and providing for pivotal movement of said links as a unit until said shoes engage the drum and enabling pivotal movement of said links relative to one another thereafter.

35. The invention of claim 34 wherein said abutment means comprises a pair of rotatable cams respectively engageable with said first ends of the shoes, a gear fixed to rotate with each cam and the gears being in meshed relation, said other link engaging one of said gears to rotate said bear on movement of said other link, and means for preventing rotation of said gears and cams in reverse adjustment direction.

36. The invention of claim 35 wherein the brake application actuator means further comprises fixed anchor means preventing lateral displacement of the wedge means and thereby preventing rotary displacement of the shoes as the result of unequal brake reaction forces of the leading and trailing shoes against the drum.

37. A brake mechanism for association with a brakedrum to effect braking of the drum, said brake mechanism comprising a pair of brakeshoes for mounting in said drum, and displaceable to contact the drum, one shoe being a loading shoe and the other a trailing shoe, each brakeshoe having first and second ends, the first ends of the shoes being adjacent to each other and the second ends being adjacent to each other, abutment means contacting the respective first ends of the shoes for brake adjustment purposes, and actuator means for effecting equal displacement of the second ends of the brakeshoes during braking, and said abutment means and said actuator means having cooperating floating engagements with the first and second ends of the brakeshoes respectively and both said abutment means and said actuator means being oriented to apply forces to the shoe ends in directions to impose maximum shoe to drum pressure near the centers of the shoes and provide minimum shoe and drum distortion wherein the brake actuator means comprises wedge means interposed between the second ends of the shoes and movable between the second ends to displace the shoes into drum engaging brake applying relation, and fixed anchor means preventing lateral movement of the wedge means and thus rotary movement of the shoes as the result of unequal brake reaction forces of the leading and trailing shoes, and contact means between the wedge means and the second ends of the brakeshoes, the wedge means and the contact means having engaging faces oriented to apply brake application forces through the second ends of the brakeshoes in directions vectored toward the central portions of the shoes, imposing maximum shoe to drum pressures near the centers of the shoes for maximum shoe and drum distortion.

UNITED STATES PATENT OFFICE
CERTIFICATE OF CORRECTION

Patent No. 3,572,478                    Dated March 30, 1971

Inventor(s) William S. Nagel et al.

It is certified that error appears in the above-identified patent and that said Letters Patent are hereby corrected as shown below:

Column 5, line 45, after "brake" insert -- shoe --. Column 13, line 6, "baking" should read -- backing --. Column 14, line 17, "bear" should read -- gear --; line 58, after "maximum" and before "shoe", second occurrence, insert -- bra lining wear near the centers, and minimum --.

Signed and sealed this 14th day of September 1971.

(SEAL)
Attest:

EDWARD M. FLETCHER, JR.           ROBERT GOTTSCHALK
Attesting Officer                 Acting Commissioner of Pate: